Dec. 7, 1954   W. A. BILLINGS ET AL   2,696,227
JOINING WIRE

Filed May 22, 1952   11 Sheets-Sheet 1

INVENTOR
W. A. BILLINGS
Z. BRZOZOWSKI
BY
Philip M. Bolton
ATTORNEY

Dec. 7, 1954     W. A. BILLINGS ET AL     2,696,227
JOINING WIRE Filed May 22, 1952     11 Sheets-Sheet 6

FIG.11.

INVENTOR
W. A. BILLINGS
Z. BRZOZOWSKI
BY
Philip M. Bolton
ATTORNEY

Dec. 7, 1954　　　W. A. BILLINGS ET AL　　　2,696,227
JOINING WIRE
Filed May 22, 1952　　　　　　　　　　　　11 Sheets-Sheet 10

INVENTOR
W. A. BILLINGS
Z. BRZOZOWSKI
BY
Philip M. Bolton
ATTORNEY

United States Patent Office 2,696,227
Patented Dec. 7, 1954

2,696,227
JOINING WIRE

William Alfred Billings and Zygmunt Brzozowski, London, England, assignors to International Standard Electric Corporation, New York, N. Y.

Application May 22, 1952, Serial No. 289,398

Claims priority, application Great Britain May 31, 1951

4 Claims. (Cl. 140—112)

The present invention relates to a machine for forming three-part electric leads such as are used in the radio valve and lamp making industries.

It has long been the practice to fabricate the lead-out conductors for electric lamps and radio valves in three parts butt welded end to end, the middle parts being of copper-coated nickel-iron alloy sealing readily to glass. For the larger types of leads it is still commonplace to use flame welding for uniting the three parts together, but for small leads, such as required for miniature radio valves, the middle portion becomes so short that flame welding is impracticable and recourse has to be made to electric welding, condenser welding being particularly suitable. At the same time it is desirable that the manufacture of these leads should be made entirely automatic.

According to the present invention there is provided a machine for automatically forming electric lead wires each having three co-linear parts of different material butt-welded end to end, in which the end of a length of wire stock is presented to a pin which is to form one end part of the said lead wire, is severed to the length required to form the intermediate part and is welded to the said pin, and in which the end of a further length of wire stock is severed to the required length and is presented to the free end of the said intermediate part and is butt-welded thereto, the completed three-part lead wire then being released from the machine and a further lead wire being formed.

According to another aspect of the invention there is provided a machine for automatically forming electric lead wires each having three co-linear parts butt-welded end to end, comprising respective hands each adapted to hold a respective one of the three parts during welding, means at respective loading positions feeding the respective parts to the said hands and means translating the said hands from their respective loading positions to adjacent positions intermediate the said loading positions aligned with a common electric contact supplying welding current to join the parts together.

The invention will be described with reference to the accompanying drawings in which.

Figure 1:
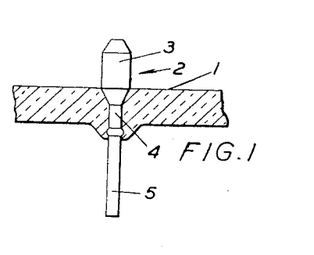
Fig. 1 is an enlarged view of a three-part lead sealed through a portion of the base of a radio valve envelope.

The embodiment of the invention which is illustrated in the constructional figures of the drawings is particularly intended for the manufacture of miniature lead wires of the type shown in the enlarged view of Fig. 1, in which reference numeral 1 indicates part of the glass base of a radio valve through which is sealed a three-part lead 2 comprising a pin 3 for insertion into a valve socket, a middle part 4 of copper clad nickel-iron alloy such as known in the trade as Dumet wire and a nickel part 5 to which the electrodes are connected. In a typical valve base the parts 3 and 5, although mechanically joined to the glass, do not form a hermetic seal therewith, the latter being provided by the Dumet part 4 whose thermal expansion is suitable for providing a hermetic metal-glass seal. In the manufacture of a lead wire 2 according to the invention the pin 3 will normally be prefabricated in another machine which cuts the pin from a spool of wire stock and points the ends. The parts 4 and 5 will be severed in the machine according to the invention from their respective lengths of wire stock. As is shown in Fig. 1 the part 4 is short but the part 5 is considerably longer and may readily be bent if special precautions are not taken to avoid this during the lead forming process, and particularly when the part is severed from the wire stock.

Although, as has been stated above, the three parts of the three-part lead will normally be of different length, and also possibly of different thickness, for the purpose of illustrating the principles of the invention with reference to Figs. 2 to 10 it will be assumed that the three parts are all of the same length.

Figures 2, 3:
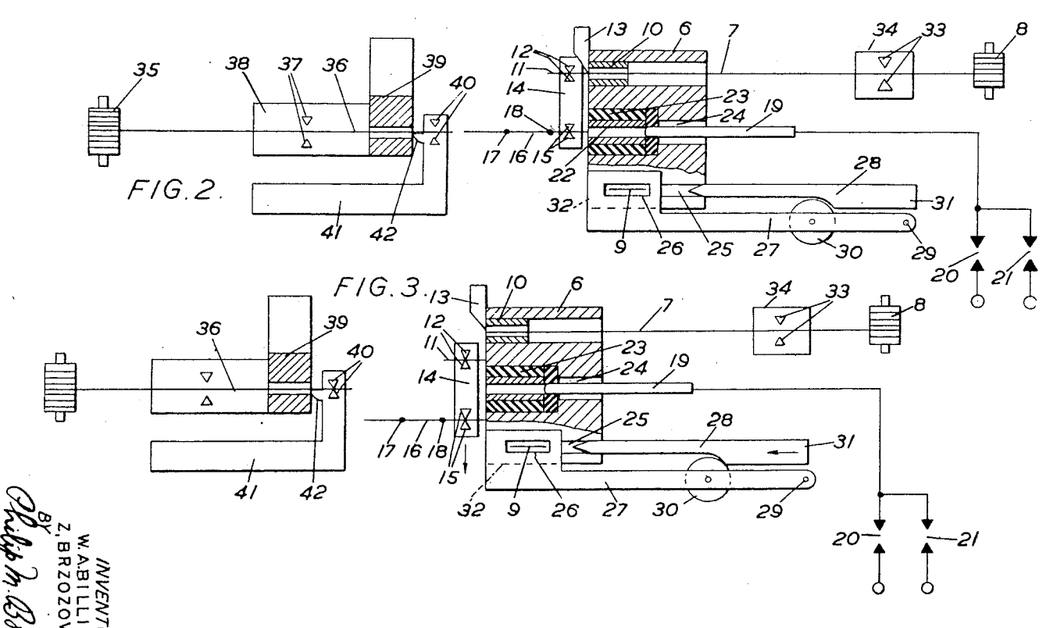
Figs. 2–10 are diagrams illustrating the sequence of operations of the machine.

Referring to Fig. 2 of the accompanying drawings there is shown diagrammatically, in partial cross-section, a feedblock 6 into which are introduced a length of Dumet wire 7 from a spool 8 and a pin 9 such as the pin part 3 of Fig. 1. The wire 7 passes through a guide formed by a closely fitting die 10 and a portion 11 of the wire is shown gripped by a hand 12, indicated symbolically, after it has been severed from the wire length 7 by movement of the knife 13 across the end of the die. The hand 12, which will be referred to as the Dumet hand, is mounted upon a slide 14 to be referred to as the transfer slide. At the other end of the transfer slide 14 a hand 15 is shown grasping a completed lead wire 16 by the pin end, the welds to the other two parts being indicated at 17 and 18. The transfer slide is capable of movement across the face of the feed block 6 and in Fig. 2 is shown in the rear position at one extreme of its motion. In this position the Dumet hand 12 is in the loading position, while the pin hand 15 is positioned opposite a welding contact rod 19, which is free to slide in a guide insulated from the block 6. When the rod 19 is moved to the left to contact the end of the pin held in the pin hand 15 a path is provided for current to flow through one of the switches 20 or 21 from a source of welding current supply—in practice a condenser. In order to provide an insulated bearing for the welding contact rod 19 a metal sleeve 22 is supported in the feed block 6 by means of a sleeve 23 and an end ring 24, both of insulating material.

The pin 9 is shown resting in a V-groove 25 forming a guide into which it has been dropped from a slot 26 in a pin feed arm 27, and is now in position to be pushed out of the feed block by a pin push rod 28. The feed arm 27 is pivoted at 29, and a roller 30 fixed to the arm reacts against a flange 31 on the pin push rod 28, so as to move feed arm 27 over a plate 32 adjacent the V-groove 25. The pin 9 is dropped from a hopper (not shown) into the slot 26 when it is away from the groove and is then rolled over the plate 32 into the slot as the pin push rod 26 moves to the right, the feed arm 27 being returned to its closed position by means such as a spring not shown.

When the transfer slide 14 is at the forward end of its stroke, the pin hand 15 is opposite the V-groove 25 while the Dumet hand 12 is then opposite the welding position. The Dumet wire 7 is fed from the spool 8 as required by means of a Dumet feed hand 33.

On the left hand side of Fig. 2 there is represented a spool 35 from which nickel wire 36 is fed by means of a nickel wire feed hand 37 mounted upon a nickel wire feed slide 38 through a die 39 into a hand 40 which will be referred to as the welding hand. The welding hand 40 is shown in the open position mounted upon a weld slide 41 capable of movement at right angles to the transfer slide, the hand 40 being in alignment with the welding contact rod 19. The welding hand 40 is arranged to provide a shoulder 42 which functions as a fixed knife for severing the nickel wire by forward movement of the die 39.

The arrangement described is such that the three parts of the lead are held in respective hands which transfer the parts from respective loading positions to positions in alignment with a common welding position, the translatory motion of each hand being restricted to reciprocating motion in a single straight line.

All the feeding, transfer and severing motions mentioned above are operated by means of cams situated at the rear and sides of the machine, all "hands" being magnetically operated. In Fig. 2 the positions of the various parts are those corresponding to an arbitrary zero or 360° position of the cam shaft.

In Fig. 3 the cam shafts are assumed to have revolved through 40°. The transfer slide 14 is moving forwards, carrying the Dumet wire part 11 from the loading position to the welding position. The completed lead 16 is still being grasped by the pin hand 15. At the same time the pin push rod 28 has commenced to move inwards towards the pin 9 and on the other side of the machine the welding hand 40 has closed round the end of the nickel wire 36 preparatory to the nickel wire part of the lead being severed from the length of wire stock.

Figures 4, 5:
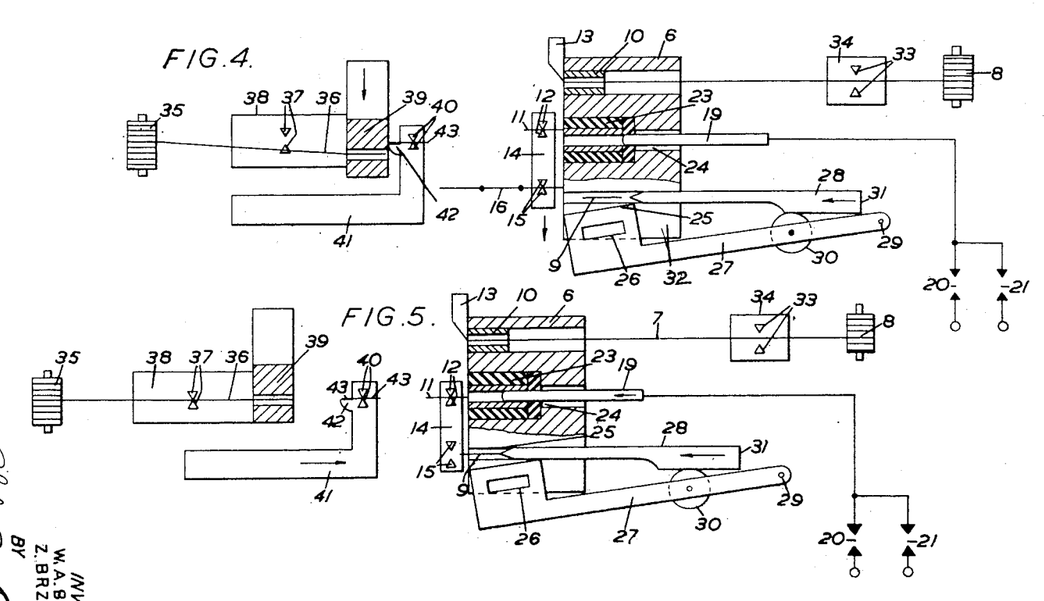

In Fig. 4 the cam shaft has completed 65° rotation. The pin push rod 28 has moved further into the feed block forcing the pin feed arm 27 aside so that the slot 26 is now positioned over the plate 32. Meanwhile, on the other side of the machine, the nickel wire die 39 has moved across the shoulder 42 so as to sever the wire held in the welding hand 40 to form the nickel wire part 43. The constructional embodiment to be described below is designed for a lead in which the nickel wire part 42 is comparatively long. Risk of bending the lead part is avoided by moving the die against a knife edge, rather than the usual practice of moving a knife across the die. In the drawing the wire 36 has been shown carried down so as to lie obliquely across the slide 38; in practice, of course, the movement of the die required is so small in relation to the length of wire that the displacement of the wire 36 is negligible.

In Fig. 5 the moving parts are shown in the position corresponding to 120° cam shaft rotation. The transfer slide 14 has moved to the forward end of its stroke, the pin hand 15 being opened. The pin push rod 28 is projecting the pin 9 into the open pin hand 15 from which it ejects the completed lead 16 shown in Figs. 2, 3 and 4 which is then removed from the machine by dropping into a chute not shown. The hand 15 is arranged so that there is always sufficient pressure between the fingers of the hand to prevent the pin 9 being shot straight through and not being grasped. The Dumet wire part 11 is now in the welding position, the welding contact rod 19 is moving in to the contact position, and the weld slide 41 is carrying the nickel wire lead part 43 into the welding position in which it will be abutting against the end of the Dumet part 11. At the same time the nickel wire feed hand 37 has closed about the nickel wire 36, the die 39 has returned to its normal position, and the nickel wire feed slide is ready to move to the right to withdraw a further length of nickel wire from the spool 35.

Figure 6:
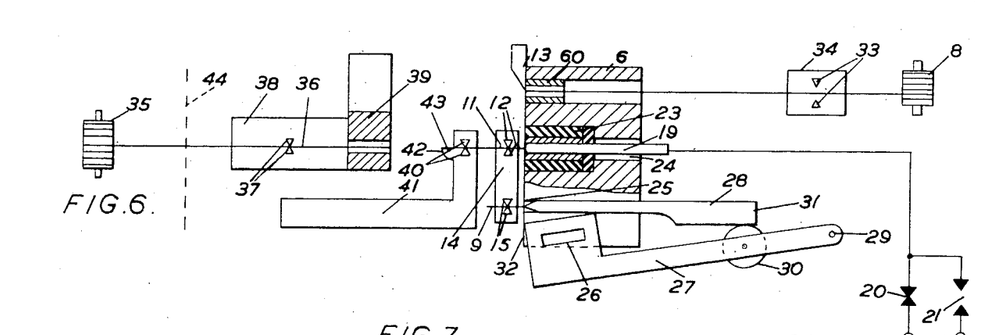
Figure 7:
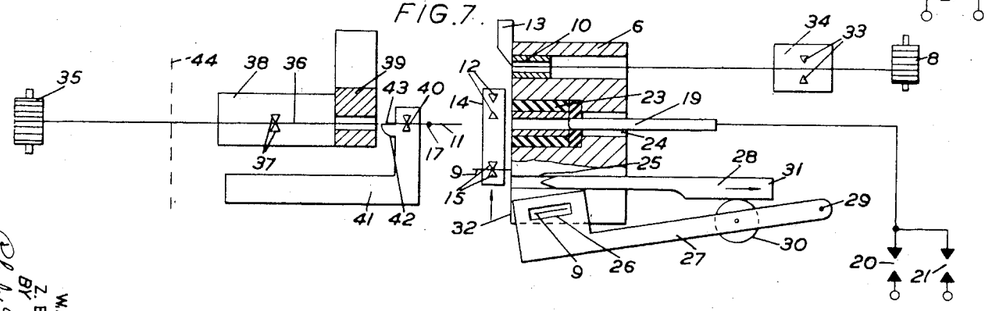

In Fig. 6, corresponding to a cam shaft rotation of 170°, the pin push rod 28 is shown right forward and the pin hand 15 has closed to grasp the pin 9. The weld slide 41 has carried the nickel wire part 43 into the welding position, and is now stationary. At the same time, the welding contact rod 19 is right forward, making contact with the end of the Dumet lead part 11, and the switch contact 20 has closed. Both Dumet hand 12 and the pin hand 15 are insulated from the rest of the machine, so that welding current flows through the contact 20, welding contact rod 19, Dumet lead part 11 and nickel wire part 42, to the welding hand 40 from whence the circuit to the welding supply condenser is completed through the bed plate of the machine.

While this first welding operation is taking place, the nickel wire feed slide 38 has moved forward by the length of the nickel wire lead part. In the figure the home position end of the nickel wire feed slide is indicated by the dotted line 4.

The positions of the various parts at 210° cam-shaft rotation is shown in Fig. 6. The transfer slide 14 is moving back carrying the pin 9 towards the welding position, the pin push rod 28 is also on its backward stroke, while a fresh pin 9 is shown having been inserted into the slot 26 of the pin feed arm 27. The welding contact rod 19 has moved back and the Dumet hand 12 has opened, so releasing the Dumet part 11 which is shown welded to the nickel wire part 43, held in the welding hand 40. The weld slide 41 has moved sufficiently far back not to foul the pin 9 being carried to the welding position.

Figures 8, 9:
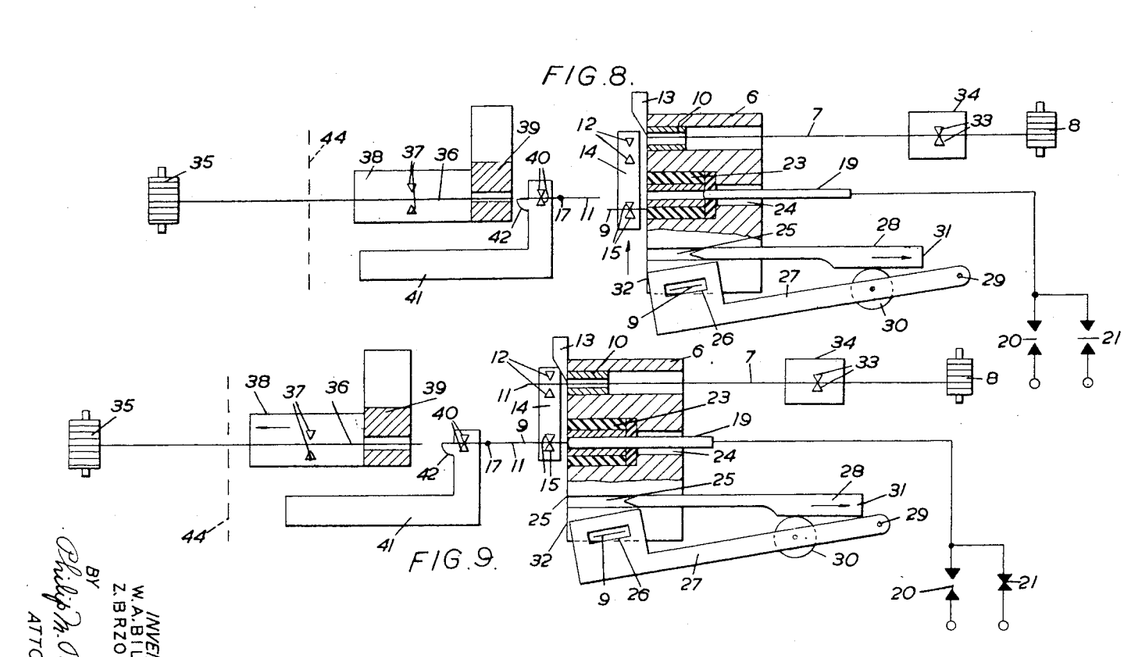

In Fig. 8, at 230° cam rotation, we have shown the pin push rod 28 still moving on its backward stroke, the transfer slide 14 not yet having carried the pin 9 quite into the welding position. The Dumet feed hand 33 has now closed preparatory to the Dumet feed slide 34 moving forward, while the nickel wire feed hand 37 has now opened preparatory to the nickel wire feed slide moving back into its home position.

In Fig. 9, at 270° cam-shaft rotation, the transfer slide has moved to the rearward end of its stroke, bringing the pin 9 into the welding position and the Dumet hand 12 into the loading position. The pin push rod 28 is still moving backward, the welding contact rod is contacting the pin 9 and the switch contact 21 has closed. The Dumet feed slide 34 has moved forwards, inserting the end of the Dumet wire 7 into the open Dumet hand 12. The weld slide 41 has moved for sufficiently for the Dumet part 11 to contact the end of the pin 9, so completing the welding circuit. Finally, the nickel wire feed slide 38 is shown moving towards its home position, leaving the end of the nickel wire 36 projecting from the end of the die 39.

Figure 10:
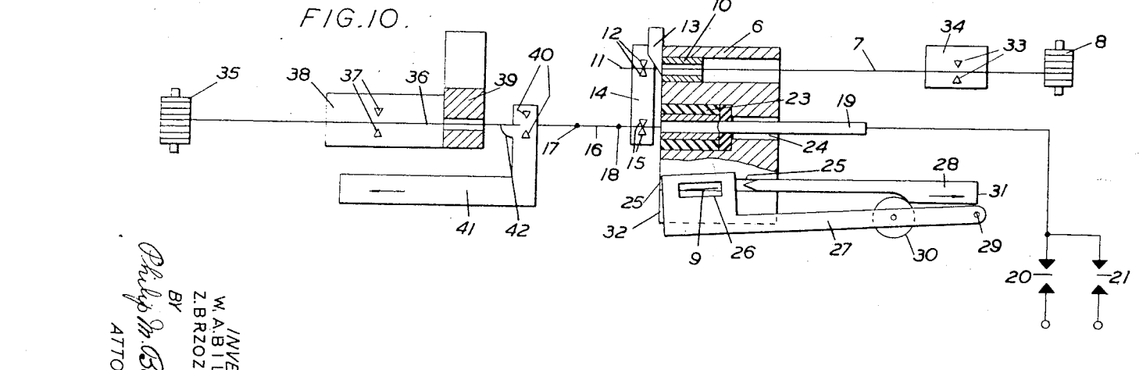

In Fig. 10, at 330° cam rotation, the pin push rod 28 is shown still moving but is nearly at the back of its stroke, so allowing the pin feed arm 27 to move across the plate 32 rolling the new pin 9 towards the V-groove 25. The transfer slide 14 is still in its rearward position with the newly completed three-part lead 16 held by the pin end in the pin hand 15. The welding push rod 19 has moved back and both the switches 20 and 21 are again open. The Dumet feed slide 34 has returned to its home position, with the Dumet feed hand 33 open. At the same time the Dumet hand 12 on the transfer slide has closed, and the knife 13 is shown moving forward to sever a new Dumet part 11 from the Dumet wire 7. At the left hand side of the drawing the welding hand 40 is shown open so releasing its grip of the nickel wire part of the new lead 16 while the weld slide 41 is moving back. The nickel wire feed slide 38 is shown as having returned to its home position.

Finally, at 360° cam rotation, the parts have moved back again into the positions as shown in Fig. 2, thus completing a cycle of operations.

While we have described the manufacture according to the invention of a three-part lead having a pin at one end, it is evident that the invention is equally applicable to the manufacture of three-part leads from parts all of which are fed from lengths of wire stock. Thus the pin feeding arrangements could readily be replaced by a further wire die and feed slide and severing arrangements similar to that provided for the Dumet wire described above.

In the constructional embodiment now to be described with reference to Figs. 11–19 we shall, so far as possible, refer to the parts by means of the same reference numerals as used in connection with the diagrams of Figs. 2–10.

Figure 11:
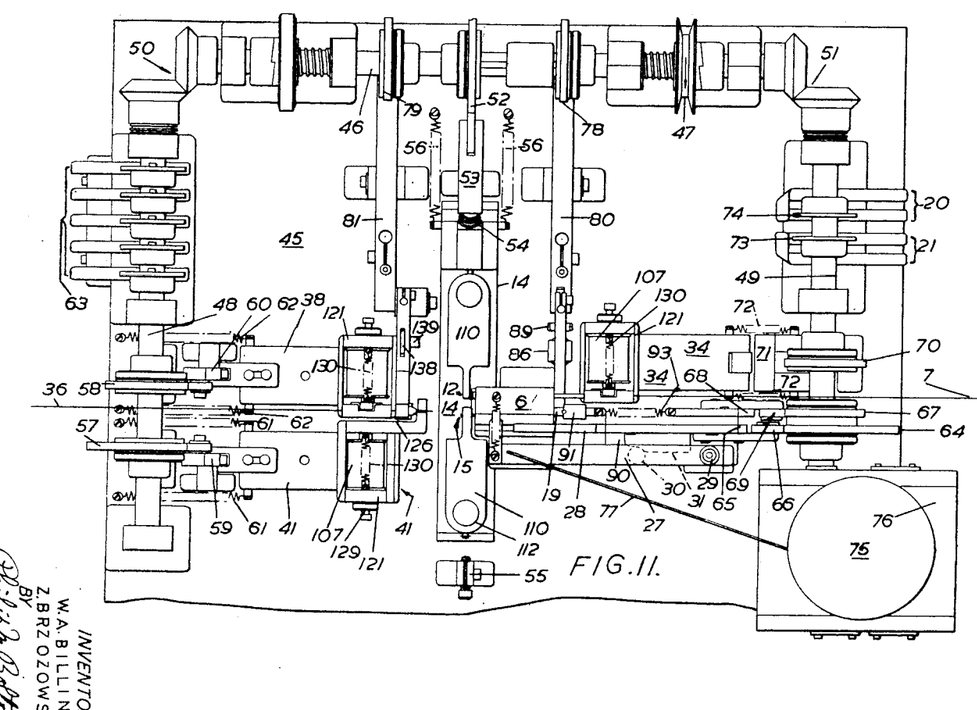
Fig. 11 is a plan view of a machine embodying the invention.

A plan view of the general assembly of an embodiment of the invention is shown in Fig. 11. The components are mounted on a bed plate 45, on three sides of which are mounted a main cam-shaft 46, driven by means of a belt passing over a pulley 47 from a suitable motor mounted between the machine, and a pair of side shafts 48 and 49 driven by respective bevel gears 50 and 51 from the main shaft. The cam 52 on the main shaft drives the transfer slide 14 through an inclined cam follower 53 and compression spring 54 which permits a front stop 55 to limit the forward stroke. The transfer slide is returned on its backward stroke by means of extension springs 56.

The side cam-shaft 48 drives the weld slide 41 and the nickel wire feed slide 38 through cams 57 and 58 respectively, the drive being transmitted to lever type cam followers 59 and 60 against respective pairs of tension springs 61 and 62. The side shaft 50 also carries cams operating five switches 63 controlling the supply of current to the magnets of the respective wire feed and lead part gripping hands.

The side shaft 49 carries a cam 64 driving the pin push rod 28 through slide 65 and cam following roller 66. A cam 67 similarly drives the adjacent welding contact rod slide 68 through cam following roller 69. A cam 70 drives the Dumet wire feed slide 34 through the cam follower 71 against a pair of return springs 72. The side shaft 49 also carries cams 73 and 74 operating respective parallel pairs of switch contacts 20 and 21 which connect the welding contact rod 19 to the source of welding current supply. A pin feed hopper 75, with the details of which we are not here concerned, is driven from the side shaft 49 through a gear box 76 projecting pins as required through the delivery tube 77 to the feed block 6.

On the main cam-shaft 6 there are two additional cams 78 and 79 respectively. Cam 78 operates a rocker arm 80 for actuating the Dumet wire cutting knife, as will be described later. Similarly cam 79 operates a rocker arm 81 for driving the nickel wire severing mechanism. The Dumet wire 7 and the nickel wire 36 are fed from respective spool to the right and left of the machine through wire straightening devices such as are commonly used in the industry. These spools and wire straightening devices are omitted from the drawing.

Figure 12:
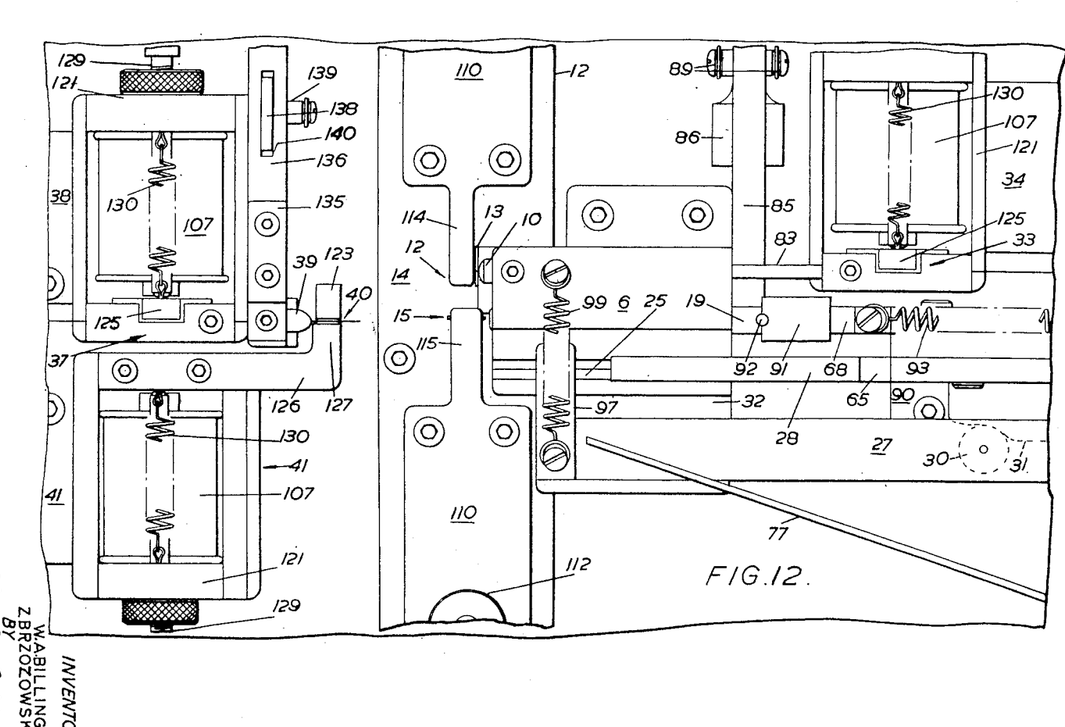
Fig. 12 is an enlarged view of part of Fig. 11.

While Fig. 11 shows an overall plan view of the machine, for the sake of clarity the essential area centred round the welding and loading positions for the lead wire parts is reproduced to a larger scale in Fig. 12.

*Feed block and associated mechanism*

Figure 13:
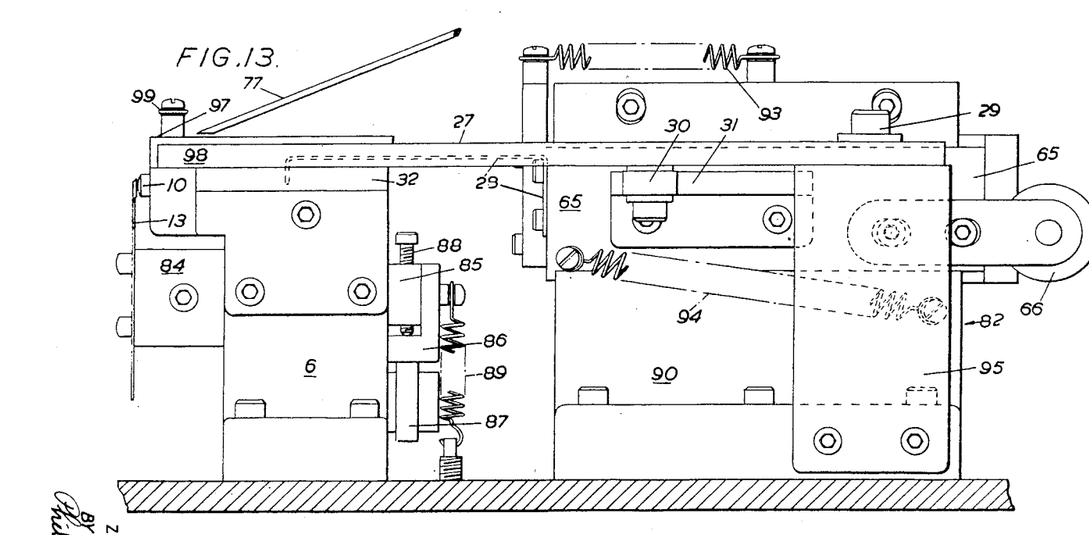
Figs. 13–19 are elevational views of various parts of the machine of Fig. 11.
Figures 14, 16:
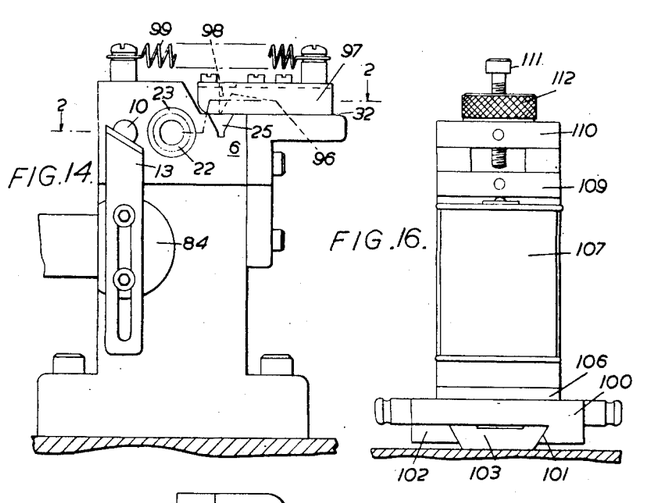

Referring now to Figs. 12, 13 and 14, we have shown in elevation in Fig. 13, as viewed from the front of the machine, the assembly of the feed block 6 together with the pin push rod slide and welding contact rod slide assembly 82, while in Fig. 14 we show an elevational view of feed block 6 as seen from the transfer slide 14. The representation of the feed block 6 shown in Figs. 2 to 10 is a somewhat diagrammatic representation of the view which would be obtained by taking a section along the line 2—2 of Fig. 12.

The guides in the feed block for the Dumet wire and for the pin portion of the three part lead lie in the same horizontal plane and are equally spaced to either side of the centre of the welding contact rod. In order to allow for the shorter length of the Dumet wire part, as compared with the pin, the die 10 projects somewhat from the face of the feed block. Owing to the fact that the Dumet wire feed hand 33 (Fig. 12) is somewhat far removed from the rear of the feed block, to avoid buckling of the Dumet wire between these members, a tube 83, mounted on the Dumet wire feed slide 34, projects inside the feed block and provides a guide for the wire. The Dumet wire knife 13 is mounted upon a boss 84 secured to a shaft passing through the feed block and carrying an actuating arm 85 at the rear thereof. The arm 85 carries a crank arm 86 pivoted thereto having its other end resting upon a roller 87 on the end of the rocker arm 80 of Fig. 11. The end of the arm 85 is adjusted in relation to the crank arm 86 by means of an adjusting screw 88 which is threaded in the arm 85 and bears against the end of the crank arm 86 under the tension of springs 89.

The welding contact rod and pin push slides are mounted in a common block 90 screwed to the bed plate of the machine. The welding contact rod 19 is secured to the forward end of its slide 68 by means of an insulating coupling 91 visible in Fig. 12. A lead from the welding contacts 20 and 21 is connected to the rod 19 through a terminal pin 92. As has previously been explained in connection with the diagrams of Figs. 2–10, the welding contact rod 19 rides in the feed block in the bearing 22 which is surrounded by an insulating sleeve 23, both of which are seen in Fig. 14. The roller 69 on the slide 68 is kept in position against its actuating cam by means of the spring 3, one end of which is mounted on the slide and the other on the feed block.

The pin push rod 28, part of which is shown dotted in Fig. 13, is secured to the front end of its slide 65, the rear end of which carries the cam following roller 66 kept in contact with the cam by means of the spring 94. The forward end of the pin push rod 28 moves in the V-groove 25, the bottom of which, as is seen in Fig. 14, is channelled out to permit the pin portion of the three-part lead to be slid readily therealong.

In the mechanism described with reference to Figs. 2–10, instead of a pin being dropped directly into the V-groove 25 from the pin hopper, an intermediate feeding device consisting of the pivoted pin feed arm 27 has been described. It is found that if pins are fed from the tube 77 directly into the V-groove from a height of a foot or so above the groove, there is a tendency for the pin to bounce, with the result that at high speeds of operation of the machine pins may not be properly fed into the pin hand of the transfer slide. In the present embodiment the pin feed arm 27 is pivoted about a bearing 29 in a bracket 95 mounted on the slide mounting block 90. The forward end of the arm 27 is bevelled on one side as indicated by the dotted line at 96 in Fig. 14, while an L-shaped member 97 is secured over the end of the arm 27 so that, when the feed arm is in the closed position as shown in the drawings, the member 97 projects over the V-groove 25. Member 97 carries a stud 98 which forms with the bevel 96 and upper portion of member 97 a covered-in slot trapping the pin 9 on its delivery from the tube 77 and corresponds to the slot 26 shown in Figs. 2–10.

As explained above in connection with the diagrams of Figs. 2–10, the feed arm 27 carries a roller 30 bearing against the edge of a shaped flange 31 on the pin push slide 65. A spring 99 maintains the roller 30 in contact with the surface of flange 31. As the pin push rod slide 65 moves forward it pushes the arm 27 aside so that the covered-in feed slot moves over the plate 32 mounted on the side of the feed block. Thus, when the pin is dropped through the tube 77, it falls between the bevel 96 and the stud 98 and, during the return motion of the feed arm, is rolled over the surface 32 into the V-groove 25.

*Transfer slide*

Figure 15:
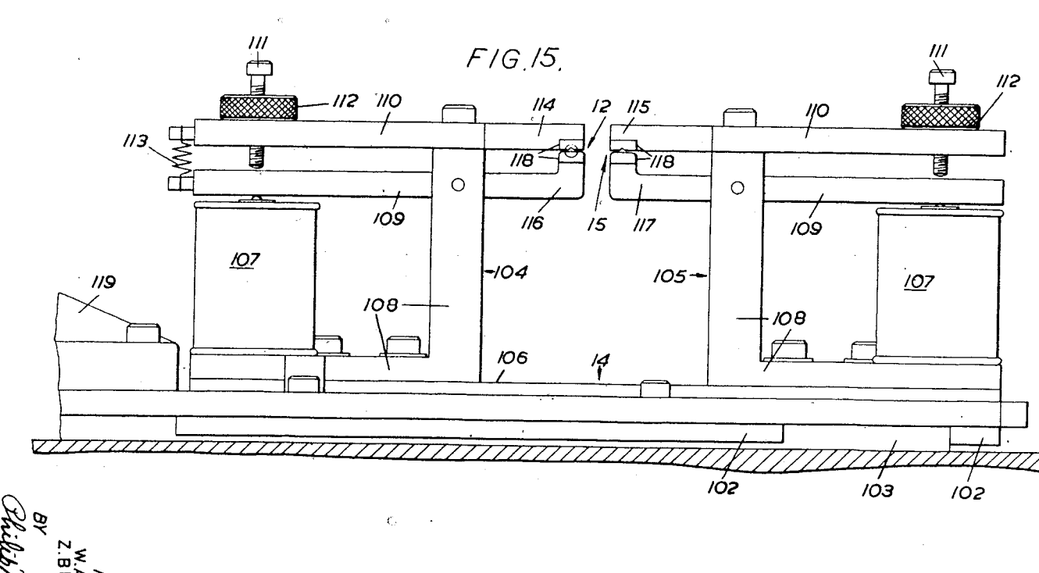

The transfer slide 14 is shown in Fig. 15 in side elevation as it would be seen looking towards the feed block and an end elevation is shown in Fig. 16. The body of the slide is typical of that of the remaining slides to be described, comprising essentially a plate 100 having a re-entrant bevelled surface 101 on the underside. A bevel plate 102, secured to the plate 99 so that the bevels face one another, retains the slide on a bearing plate 103 which is fixed to the bed plate of the machine. In the case of the slide 14, a pair of magnetic hand assemblies 104 and 105 are mounted upon a sheet of insulating material 106 which is fixed to the plate 99. Each of the assemblies 104 and 105 comprises a solenoid 107. The solenoid is mounted upon a core and energizes a magnetic circuit comprising a yoke 108 and armature 109. The vertical members of the yokes 108 each carry fixed arms 110 on which are mounted back stops each comprising an adjusting screw 111 and a lock nut 112. The armature of assembly 104 is held away from its energizing solenoid by the return spring 113, but a return spring is omitted from the assembly 105. The fixed arm of assembly 104 carries a finger 114 and that of assembly 105 carries a similar but wider finger 115. Similarly the armature of assemblies 104 and 105 carry respective fingers 116 and 117. Each of the fingers is provided with a tungsten carbide insert 118, and is preferably constructed of non-magnetic material so as not to attract the ferro-magnetic lead parts. The fingers 114 and 116 constitute the Dumet hand 12 of Figs. 2–10 while the fingers 115 and 117 form the pin hand 15. There being no return spring on the armature of assembly 105, the hand is normally closed by the weight of the armature so as to provide a light grip on any pin inserted therein, when the magnet is unenergized, the pin being firmly held when current is supplied to the solenoid. The motion of the transfer slide 14, as explained in connection with Fig. 11, is transmitted through a compression spring 54; the member 119 seen to the left of Fig. 15 provides a seating for the compression spring 54.

*Weld slide*

Figure 17:
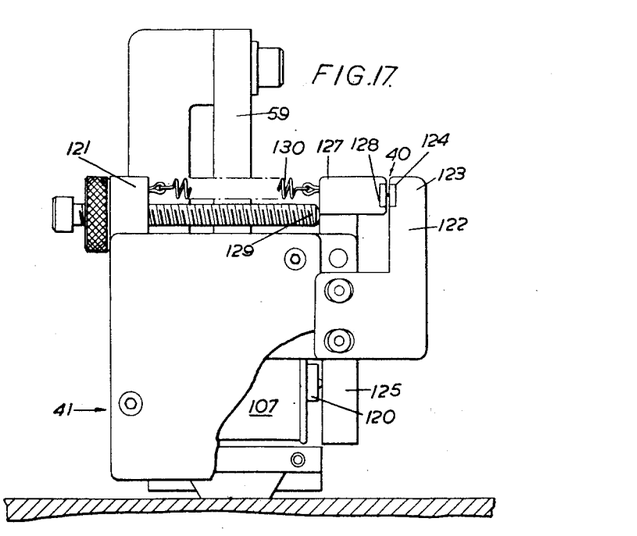

An end view of the weld slide, partly broken away, as seen from the transfer slide, is shown in Fig. 17. Referring now to Figs. 12 and 17, it will be seen that the mounting of the slide is similar to that of the transfer slide 14, differing only in that different dimensions are involved, that the welding hand is not insulated from the bed plate of the machine as in the case of the hands carried on the transfer slide, and that the drive from the actuating cam is by way of a lever type cam follower 59 (Fig. 11) part of which is visible in Fig. 17. The slide carries a solenoid 107 identical with those on transfer slide, the core 120 being mounted horizontally across the slide instead of vertically. The yoke 121 carries a bent arm 122 which terminates in a finger 123 of non-magnetic material provided with a tungsten carbide insert 124 on the inner surface thereof. The armature 125 carries a bent arm 126 terminating in the moving finger 127 of non-magnetic material having a tungsten carbide insert 128. The fingers 123 and 127 constitute the welding hand 40. When the magnet is unenergized the moving finger 127 is held against a back stop 129 by means of an extension spring 130.

*Dumet wire feed slide*

Figure 18:
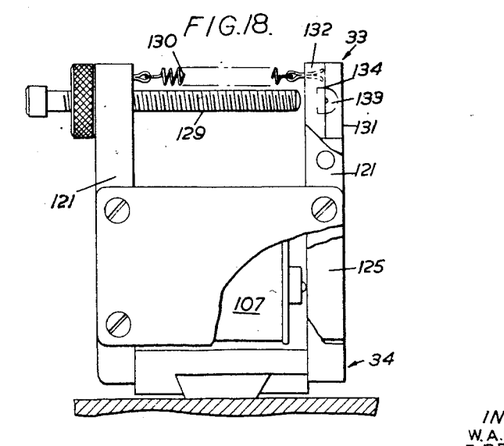

An end view of the Dumet wire feed slide, as seen from the transfer slide position, is shown with parts cut away and in cross-section in Fig. 18. In essentials the slide is very similar to the welding slide just described, and has with it many piece parts in common. The arrangements of solenoid 107, yoke 121 and armature 125 is the same as in the welding slide; but in this case the fixed finger 131 and moving finger 132 of the Dumet wire feed hand 33 are mounted directly upon the yoke and armature respectively. The tungsten carbide insert 133 carries a semi-circular groove for the Dumet wire while insert 134 of the moving finger 132 is flat. The back stop 129 and the return spring 130 are similar piece parts to those on the welding slide.

*Nickel wire feed slide*

Figure 19:
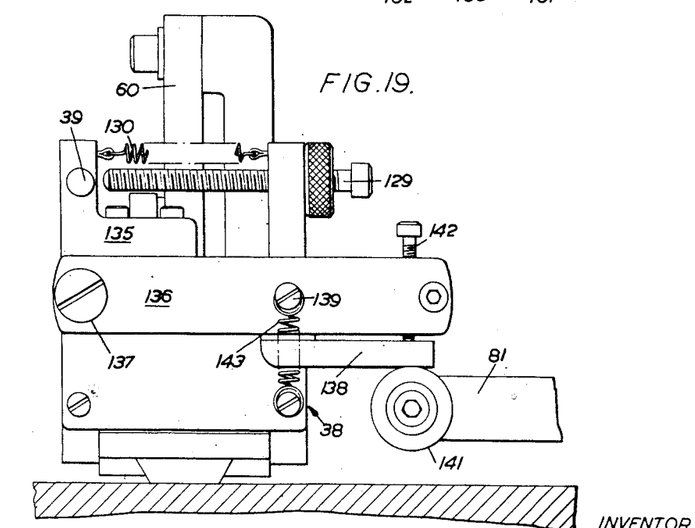

Fig. 19 shows an end view of the nickel wire feed slide as seen from the transfer slide with the welding slide removed. The magnet assembly is similar to those described for the other slides, and need not be described again. In Fig. 19 part of the lever type cam follower 60 is seen at the rear of the assembly. In the description with reference to Figs. 2–10 the nickel wire slide 38 was shown and described as carrying a die 39 movable at right angles across the slide to sever the nickel wire part held in the hand 40. The arrangement of die and welding hand in the severing position is seen from Fig. 12, the die moving forward towards the weld slide and just clearing the edge of finger 127 which serves as a knife. In the practical construction of Figs. 12 and 19 the die 39 is mounted upon a bracket 135 in front of the hand 37; this bracket is mounted upon an arm 136 which pivots about a bearing 137 secured to the yoke of the magnet assembly of slide 38. A crank arm 138 is carried at one end by a pivot 139 in a slot 140 on the arm 136. The other end of the crank arm rests upon a roller 141, mounted on the forward end of the rocker arm 81 of Fig. 11. The roller 141 is sufficiently wide to allow for movement of the feed slide, and the lower bearing surface of crank arm 138 is rounded to permit it to slide axially along the roller. An adjusting screw 142, threaded in the end of arm 136, bears against the upper surface of the tail of the crank arm 138, and the spring 143 maintains the pressure between the screw 142, and the tail of arm 138 and the roller 141.

The simple direct motions of the moving piece parts, the arrangement whereby one of the transfer hands is loaded while the other is in the welding position and the consequent short distances of travel of the slides, are factors which enable the machine described above to be capable of very high speeds of operation, an output of more than one hundred and twenty complete three-part leads per minute being obtainable.

While the principles of the invention have been described above in connection with specific embodiments, and particular modifications thereof, it is to be clearly understood that this description is made only by way of example and not as a limitation on the scope of the invention.

What we claim is:

1. A machine for automatically forming electric lead wires each having three co-linear parts butt-welded end to end, comprising respective mechanical hands each adapted to hold a respective one of the three parts during welding, means aligned with said hands at respective loading positions for feeding the respective parts to the said hands, slide means mounted for rectilinear motion for translating the said hands from their respective loading positions to adjacent positions intermediate the said loading positions and aligned with one another, said hands being carried on said slide means, a common electric contact aligned with the said welding positions and means for supplying welding current to join the parts together, said slide means including a common transfer slide for two of the said hands and said feeding means including means for loading each of said two hands while the other is in the welding position.

2. A machine according to claim 1 in which the said means for loading each hand comprises a feed block, the machine further comprising a welding contact rod moveable in but insulated from the said feed block.

3. A machine according to claim 2 in which said slide means also includes a further weld slide movable at right angles to the said transfer slide and carrying the third said hand.

4. A machine according to claim 2 in which an end one of the parts of the said lead is a pin, said feeding means comprising a push rod and means operating the said push rod to feed the pin into the said feed block and to insert it into one of the hands of the said transfer slide.

References Cited in the file of this patent

UNITED STATES PATENTS

| Number | Name | Date |
|---|---|---|
| 1,890,792 | Morrison | Dec. 13, 1932 |
| 2,034,560 | Bumstead | Mar. 17, 1936 |